Figure 1:
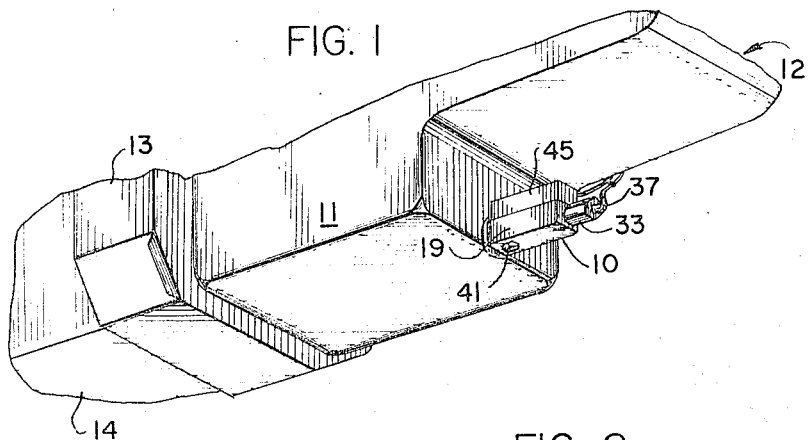

March 21, 1967  F. D. EAKER  3,310,133

REMOTE OPERATED OIL DRAIN

Filed May 20, 1964  2 Sheets-Sheet 1

INVENTOR
FORREST D. EAKER

BY
ATTORNEY

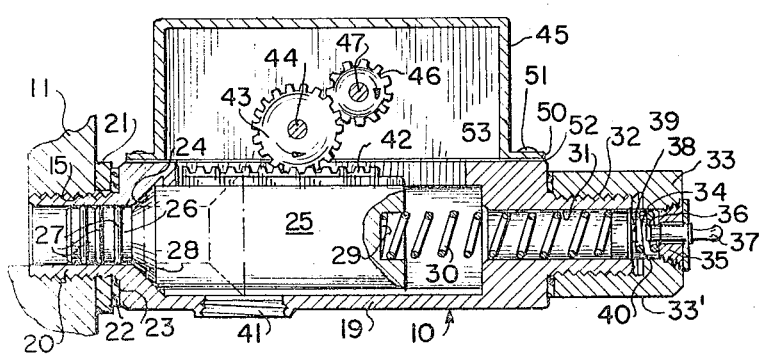

3,310,133
REMOTE OPERATED OIL DRAIN
Forrest D. Eaker, 821 N. Wood Ave.,
Florence, Ala. 35632
Filed May 20, 1964, Ser. No. 368,959
3 Claims. (Cl. 184—1.5)

This invention relates to machines, stationary and mobile, of various kinds, having moving parts which require lubrication and in which a body of lubricant is contained and distributed and from which periodically the lubricant is drained and replaced by new or fresh lubricant.

The invention relates particularly to automobiles having working parts treated with oil or lubricant in a housing with a crankcase with an oil pan or sump in which the oil is collected and from which the oil is drained and replaced after it has been used for a time and becomes dirty or contaminated.

Removing and replacing the oil in the crankcase of an internal combustion engine of an automobile is somewhat of a nuisance or problem as it requires removal of a drain plug, allowing enough time to elapse to permit the oil to drain from the oil pan, replacing the drain plug, and adding the necessary amount of fresh oil. These operations of removing the drain plug, draining the spent or used oil, and replacing the drain plug ordinarily has been considered too much of a problem to be done at home and consequently most of the time the automobile has been taken to a filling station for the change of oil. This has resulted in inconvenience to the owner of the automobile and has caused traffic congestion when service has been sought by several at once, including during inclement weather or for other reasons.

It is an object of the invention to overcome the problem having to do with the change of oil by providing a remote operated oil drain by means of which the driver of an automobile may operate a control on the dash or instrument panel of his automobile and open a drain passage in the crankcase and allow the oil to drain therefrom, after which the control can be operated to close the discharge from the oil pan, and fresh oil can be added without the owner having to get out of his automobile to drain the oil from the crankcase whenever desired, including at home, and without a service attendant or anyone having to go to a service station, thus enabling the owner to effect considerable saving in time as well as in money by purchasing oil in volume.

Another object of the invention is to provide a remote operated oil drain with safety means incorporated in the ignition system of the automobile so that the engine of the automobile cannot be operated with the drain open or without oil in the oil pan beneath the crankcase.

A further object of the invention is to provide a remote operated oil drain which can be operated either manually or electrically and with signal means on the dash or instrument panel or other location of a character to indicate when the drain is open.

Figure 2:
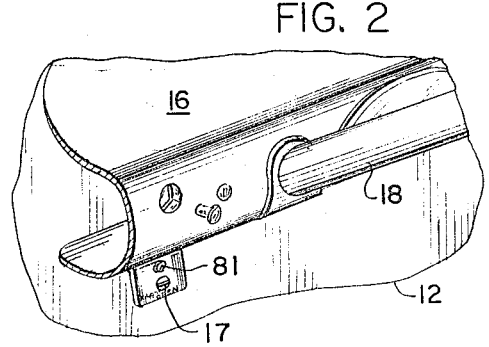
Figure 3:
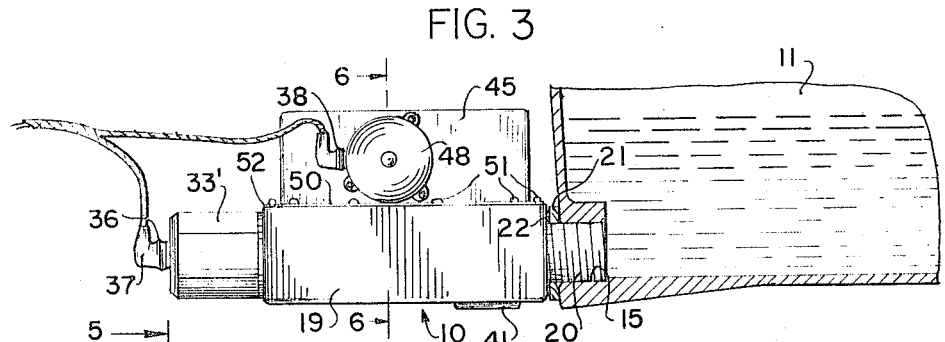
Figure 4:
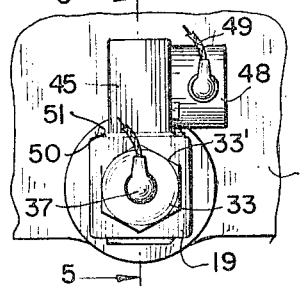

Other objects and advantages of the invention will be apparent from the following description considered in conjunction with the accompanying drawings, wherein:

FIG. 1 is a fragmentary bottom perspective of a conventional transmission fly-wheel housing and oil pan of an automobile;

FIG. 2, a fragmentary perspective of a portion of a dash or instrument panel illustrating the control mechanism for the drain of the present invention;

FIG. 3, a side elevation illustrating the drain in the oil pan;

FIG. 4, an end elevation of the oil pan and drain;

FIG. 5, a vertical section on the line 5—5 of FIG. 4;

FIG. 6, a vertical section on the line 6—6 of FIG. 3;

FIG. 7, a modified form of the invention in which the solenoid asserts a direct pulling force on the plug;

FIG. 8, a layout of the wiring diagram; and

FIG. 9, a longitudinal section through a hand-operated oil drain.

Briefly stated, the invention is a remote operated oil drain device for the crankcase of an internal combustion engine or the like, which drain can be operated to allow the discharge of the oil by gravity from the crankcase of an automobile, after which the drain can be closed to retain fresh oil when added. The oil drain may be operated mechanically as by a motor or solenoid or manually. In either case, it operates signaling means for indicating that the drain is open, and a safety switch in the ignition system so that the motor cannot be started until the drain is closed and an additional safety switch so that the motor cannot be started until oil is replaced in the crankcase.

With continued reference to the drawings, the present invention is a remote operated oil drain 10 for application to the crankcase or oil pan 11 of an automobile 12, and which may have a fly-wheel housing 13 and a transmission housing 14.

The crankcase of a conventional automobile has a threaded drain opening 15 ordinarily closed by a plug not shown, for which the oil drain 10 of the present invention is substituted and is controlled from the dash or instrument panel 16 by an operating key 17 which may be attached to the instrument panel near the steering column 18 in order that the oil drain 10 may be opened and closed from the instrument panel by operating the control 17.

The oil drain includes a valve housing 19, having a reduced externally threaded attaching portion 20, the threads of which are of a size to engage the threads of the drain opening 15 in the crankcase 11. To insure that a positive connection be maintained, a lock nut 21 may be provided, as well as a sealing gasket 22, which engages a shoulder 23 of the housing 19.

The housing 19 is provided with a valve seat 24 and within the housing is mounted a valve body 25, having a reduced cylindrical piston extension 26 equipped with piston rings 27 to form a tight connection with the interior of the attaching portion 20. A shoulder 28 is located between the large diameter of the valve body 25 and the reduced extension 27, which shoulder engages the valve seat 24 when the parts are in the position illustrated in FIG. 5.

The valve body 25 at its end opposite the reduced extension 27 has a recess 29 in which is received a helical spring 30, the remote portion of which extends through a passage 31, the housing 19 having an externally threaded extension 32 in which the passage 31 is located. Upon the reduced externally threaded portion 32 is mounted an internally threaded coupling 33, having a polygonal wrench surface 33' and a reduced passage 34 in which is received a pressure switch including an externally threaded plug 35, carrying an electrical contact 36, having a portion 37 on the exterior to which an electrical connection not shown can be made. A second contact 38 is provided, adapted to engage the contact 36, such second contact being carried on a body 39 in spaced relation to the contact 36 and normally maintained in such spaced relation when the oil drain is closed by means of a coil spring 40, such spring, however, being adapted to be overcome by the pressure of the larger helical spring 30 when the mounted body 25 is moved to unseat the valve and allow drainage through the reduced extension 20 and the discharge opening 41, located in the bottom of the housing 19.

In order to accomplish the unseating function, the valve body 25 is provided with teeth 42 which constitute a rack engaged by a pinion 43 mounted on a shaft 44 journaled in a housing 45. The pinion 43 engages or meshes with and is driven by a drive pinion 46 mounted on a shaft 47, driven by a solenoid or electrical element 48 so that it will move the valve body 25 to an open position to permit gravity drainage of the crankcase, and thereafter it can be released and moved by the spring in a reverse direction to close valve body. The electrical element 48 is supplied with electrical energy through conductors 49.

In order to maintain the valve body 25 and the gear 43 and pinion 46 fluid tight, the housing 45 is provided with a base flange 50 through which screws or other fasteners 51 extend and through a gasket 52 and into openings 53 in the housing 19.

Instead of the construction illustrated in FIG. 5 in which rack and pinion are employed to operate the valve body 25, modified constructions such as that illustrated in FIGS. 7 and 9 may be employed. In FIG. 7, the valve housing 19' is provided with a valve seat 24' and reduced externally threaded extension 20 in which is received the valve body 25' with the reduced extension 26' and valve body 25' forming shoulder 28. The valve housing also is provided with a drainage opening 41' for discharge by gravity of the oil when the valve is unseated. Instead of the valve 25' having opening 29 for the receipt of a spring, it has an internally threaded opening 29' for receipt of the reduced externally threaded portion 54 of a shaft 55 forming a core of a solenoid 56 having a flange 57 attached by fasteners 58 to the housing 19'. Current is supplied to the solenoid through conductors 59 and 60.

When the solenoid is energized, it will move the shaft 55 in one direction to open the valve and permit the discharge of oil by gravity and when de-energized, the spring will produce movement in the opposite direction to close the valve.

In FIG. 9, the valve housing 19" receives therein a valve body 25", such valve body having an elbow passageway 61, which valve body is moved to bring such passage into a position to register with discharge opening 62 by means of a flexible connection 63 extending to the dash or instrument panel 16 where it is connected to an operating knob 63'. Instead of a series of rings 27, the reduced extension 26" is provided with a groove 64 in which is located an O-ring or annular gasket 65. Also the discharge opening 62 has around it a groove 66 in which is disposed an O-ring or annular gasket 67, both O-rings or gaskets serving to prevent leakage. In order to provide a tight seal, the end of the housing 19' opposite the reduced extension 26" is provided with a reduced externally threaded extension 32" in which is received a closure member 68. Between the closure member and the valve body 25' is located a spring 69 which urges the valve toward its closed position. An internally reduced closure cap 70 has threads complementary to the threads of the reduced portion 32" so when the cap is in place, a tight joint will be provided, especially in view of the fact that the casing 71 for the operating cable 63 has a flange 72 which serves as a gasket between the member 70 and the member 68.

In FIG. 8 is disclosed a wiring diagram including the ignition switch 73 connected by means of a conductor 74 and by a safety switch or interlock 75 with a battery or other source of power 76 provided with a ground 77 to the frame of the vehicle. Electrical energy is supplied through a conductor 78 to one terminal of a drain operating switch 17, a conductor 79 extending from the opposite terminal and a conductor 80 to the drain signal light 81. A conductor 82 is connected to the opposite side of drain indicator light 81 and to contact 36. When the valve body 25 is moved to drain position, a circuit will be completed through contact 38 and conductor 83 to energize the indicator light 81 mounted on the dash or instrument panel of the automobile. When the switch 17 is closed, current will flow through conduits 49 to the electrical element 48 and then to ground to complete a circuit and energize the rack and pinion for retracting the drain plug 25.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A remotely operated oil drain device for attachment to an internal combustion engine having a crankcase and a drainage port therefor, said device comprising a hollow body, means for connecting said body to said drainage port providing communication between said body and said crankcase, said body having a valve seat, a valve in said body selectively engageable with said valve seat, said body having a drainage opening normally closed by said valve, operating means on said body for moving said valve to permit oil to flow by gravity from said crankcase through said drainage opening, means for energizing said operating means from a remote position, means to return said valve to closed position when said operating means is de-energized, and safety switch means applicable to the ignition system of the internal combustion engine for preventing the operation of the same until the drain is closed and oil is in the crankcase.

2. The structure of claim 1 in which said operating means includes a rack carried by said valve, a pinion engaging said rack for moving the same to open said valve, a gear engaging said pinion for driving the same, and electrical means for driving said gear.

3. The structure of claim 1 in which said operating means includes a solenoid having a core attached to said valve whereby operation of said solenoid will retract said valve from said valve seat.

References Cited by the Examiner

UNITED STATES PATENTS

| 173,266 | 2/1876 | Calahan | 251—250 X |
|---|---|---|---|
| 1,202,458 | 10/1916 | Ward | 251—294 X |
| 2,302,158 | 11/1942 | Van Vulpen | 251—294 X |
| 2,796,148 | 6/1957 | Banks. | |
| 3,112,012 | 11/1963 | Hoch | 184—1.5 |

LAVERNE D. GEIGER, *Primary Examiner.*

H. BELL, *Assistant Examiner.*